(12) United States Patent
Kawamura et al.

(10) Patent No.: US 9,899,649 B2
(45) Date of Patent: Feb. 20, 2018

(54) NON-AQUEOUS ELECTROLYTE SECONDARY BATTERY

(71) Applicants: NISSAN MOTOR CO., LTD., Yokohama-shi, Kanagawa (JP); AUTOMOTIVE ENERGY SUPPLY CORPORATION, Zama-shi, Kanagawa (JP)

(72) Inventors: Fumihiro Kawamura, Yokosuka (JP); Ikuma Matsuzaki, Yokohama (JP); Ryuta Yamaguchi, Yokohama (JP); Kosuke Hagiyama, Yokohama (JP); Takashi Honda, Yokohama (JP); Takeshi Miyamoto, Yokohama (JP); Osamu Shimamura, Zama (JP); Keisuke Matsumoto, Zama (JP)

(73) Assignees: Nissan Motor Co. Ltd., Yokohama-Shi, Kanagawa (JP); Automotive Energy Supply Corporation, Zama-Shi, Kanagawa (JP)

( * ) Notice: Subject to any disclaimer, the term of this patent is extended or adjusted under 35 U.S.C. 154(b) by 159 days.

(21) Appl. No.: 14/780,395
(22) PCT Filed: Mar. 26, 2014
(86) PCT No.: PCT/JP2014/058691
§ 371 (c)(1),
(2) Date: Sep. 25, 2015
(87) PCT Pub. No.: WO2014/157423
PCT Pub. Date: Oct. 2, 2014

(65) Prior Publication Data
US 2016/0149178 A1 May 26, 2016

(30) Foreign Application Priority Data
Mar. 26, 2013 (JP) .................................. 2013-064955

(51) Int. Cl.
*H01M 2/12* (2006.01)
*H01M 4/13* (2010.01)
(Continued)

(52) U.S. Cl.
CPC ............ *H01M 2/12* (2013.01); *H01M 2/166* (2013.01); *H01M 2/1653* (2013.01);
(Continued)

(58) Field of Classification Search
None
See application file for complete search history.

(56) References Cited

U.S. PATENT DOCUMENTS

2003/0124416 A1 7/2003 Kaneta
2007/0048607 A1* 3/2007 Nakashima ........... H01M 2/166
429/209
(Continued)

FOREIGN PATENT DOCUMENTS

EP 2963706 A1 1/2016
EP 2963708 A1 1/2016
(Continued)

*Primary Examiner* — Scott J Chmielecki
(74) *Attorney, Agent, or Firm* — Young Basile Hanlon & MacFarlane, P.C.

(57) ABSTRACT

A non-aqueous electrolyte secondary battery, when using an aqueous binder as a binder for a negative electrode active material, effectively exhausts the gas generated from an electrode, and thus, even when using it for a long period of time, a decrease in battery capacity is low. The non-aqueous electrolyte secondary battery includes a positive electrode active material layer on a surface of a positive electrode current collector, a negative electrode active material layer comprising an aqueous binder on a surface of a negative electrode current collector, a separator for maintaining an electrolytic solution, and a gas releasing means for releasing a gas generated within the power generating element to an extra space inside of the outer casing, and in which the ratio value of a volume of the extra space to a volume of pores included in the power generating element is 0.5 to 1.0.

13 Claims, 3 Drawing Sheets

(51) Int. Cl.
  *H01M 10/0566* (2010.01)
  *H01M 10/0585* (2010.01)
  *H01M 2/16* (2006.01)
  *H01M 10/0525* (2010.01)
  *H01M 4/62* (2006.01)
  *H01M 10/04* (2006.01)
  *H01M 2/02* (2006.01)
  *H01M 4/02* (2006.01)
  *H01M 4/133* (2010.01)

(52) U.S. Cl.
  CPC ............ *H01M 2/1686* (2013.01); *H01M 4/13* (2013.01); *H01M 4/622* (2013.01); *H01M 10/0413* (2013.01); *H01M 10/0525* (2013.01); *H01M 10/0566* (2013.01); *H01M 10/0585* (2013.01); *H01M 2/0275* (2013.01); *H01M 4/133* (2013.01); *H01M 10/049* (2013.01); *H01M 10/0468* (2013.01); *H01M 2004/021* (2013.01); *H01M 2220/20* (2013.01); *Y02T 10/7011* (2013.01)

(56) References Cited

U.S. PATENT DOCUMENTS

| | | | |
|---|---|---|---|
| 2007/0154803 A1* | 7/2007 | Kim | H01M 2/021 429/185 |
| 2009/0311588 A1* | 12/2009 | Lim | H01M 2/1653 429/129 |
| 2011/0236739 A1* | 9/2011 | Watanabe | H01M 2/1077 429/99 |
| 2012/0088129 A1 | 4/2012 | Kaneda et al. | |
| 2012/0244420 A1* | 9/2012 | Serizawa | H01M 2/02 429/163 |
| 2012/0308874 A1* | 12/2012 | Ootani | H01M 10/052 429/159 |
| 2012/0328917 A1 | 12/2012 | Sakashita et al. | |
| 2013/0224607 A1* | 8/2013 | Ihara | H01M 10/0569 429/338 |
| 2015/0017542 A1* | 1/2015 | Hirai | H01M 10/04 429/231.95 |
| 2016/0006031 A1* | 1/2016 | Kaseda | H01M 4/131 429/223 |

FOREIGN PATENT DOCUMENTS

| | | |
|---|---|---|
| EP | 2980909 A1 | 2/2016 |
| JP | 2003-017122 A | 1/2003 |
| JP | 2010-080297 A | 4/2010 |
| JP | 2010-113804 A | 5/2010 |
| JP | 2011-023221 A | 2/2011 |
| JP | 2012113875 A | 6/2012 |
| JP | 2013008550 A | 1/2013 |
| JP | 2013054966 A | 3/2013 |
| KR | 20120042752 A | 5/2012 |
| KR | 20120137834 A | 12/2012 |

* cited by examiner

NON-AQUEOUS ELECTROLYTE SECONDARY BATTERY

CROSS REFERENCE TO RELATED APPLICATION

The present application claims priority to Japanese Patent Application No. 2013-064955, filed Mar. 26, 2013, incorporated herein in its entirety.

TECHNICAL FIELD

The present invention relates to a non-aqueous electrolyte secondary battery.

BACKGROUND

In recent years, developments of electric vehicles (EV), hybrid electric vehicles (HEV) and fuel cell vehicles (FCV) have been advanced against the background of escalating environmental protection movement. For a power source for driving motors used on those vehicles, a rechargeable secondary battery is suitable. In particular, what is attracting the attention is a non-aqueous electrolyte secondary battery such as a lithium-ion secondary battery expected to provide high capacity and high output.

A non-aqueous electrolyte secondary battery is provided to have a positive electrode active material layer that is formed on a surface of a current collector and includes a positive electrode active material (for example, $LiCoO_2$, $LiMO_2$, or $LiNiO_2$). Additionally, the non-aqueous electrolyte secondary battery is provided to have a negative electrode active material layer that is formed on a surface of a current collector and includes a negative electrode active material (for example, metal lithium, carbonaceous materials such as cokes, natural and synthetic graphite, metal materials including Sn and Si and oxides of them).

A binder for binding an active material which is used for an active material layer is classified into an organic solvent-based binder (binder which is not dissolved/dispersed in water but dissolved/dispersed in an organic solvent) and an aqueous binder (a binder which is dissolved/dispersed in water). The organic solvent-based binder can be industrially disadvantageous due to high cost such as raw material cost for an organic solvent, recovery cost, and cost relating to waste processing. Meanwhile, the aqueous binder has an advantage of lowering a burden on environment and greatly suppressing an investment on facilities of a production line, since water as a raw material is conveniently available and only water vapor is generated during drying. The aqueous binder also has an advantage that, since the aqueous binder has a high binding effect even with a small amount compared to an organic solvent-based binder, it can increase a ratio of an active material per same volume so that a negative electrode with high capacity can be achieved.

From the viewpoint of having those advantages, various attempts have been made for forming a negative electrode by using an aqueous binder as a binder for forming an active material layer. For example, in JP 2010-80297 A, suggested is a non-aqueous electrolyte secondary battery, containing polyvinyl alcohol and carboxymethyl cellulose along with a latex-based binding agent such as styrene butadiene rubber (SBR) that is an aqueous binder in a negative electrode active material layer of the battery.

However, it was found that for a non-aqueous electrolyte secondary battery including a negative electrode active material layer using an aqueous binder, as compared with the case of using an organic-based binder, the amount of gas generated from an electrode at the time of initial charge and discharge increases. When the amount of gas generated increases, it may affect the properties of a battery, and thus, especially in the case of using a battery for a long period of time, battery capacity may be decreased.

SUMMARY

Therefore, an object of the present invention is to provide a non-aqueous electrolyte secondary battery, in which when using an aqueous binder as a binder for a negative electrode active material layer, the gas generated may be effectively exhausted to the outside of an electrode, and thus, even when using it for a long period of time, the decrease in battery capacity is low.

The non-aqueous electrolyte secondary battery according to the present invention has the constitution obtained by enclosing a power generating element within an outer casing. In addition, the power generating element includes a positive electrode obtained by forming a positive electrode active material layer on a surface of a positive electrode current collector, a negative electrode obtained by forming a negative electrode active material layer on a surface of a negative electrode current collector, a separator for maintaining an electrolytic solution, and a gas releasing means for releasing a gas generated within the power generating element to an extra space inside the outer casing. In addition, the negative electrode active material layer includes an aqueous binder, and has a characteristic in that the ratio value ($V_2/V_1$) of a volume $V_2$ of the extra space to a volume $V_1$ of pores included in the power generating element is 0.5 to 1.0.

DETAILED DESCRIPTION OF THE EMBODIMENTS

Figure 1:
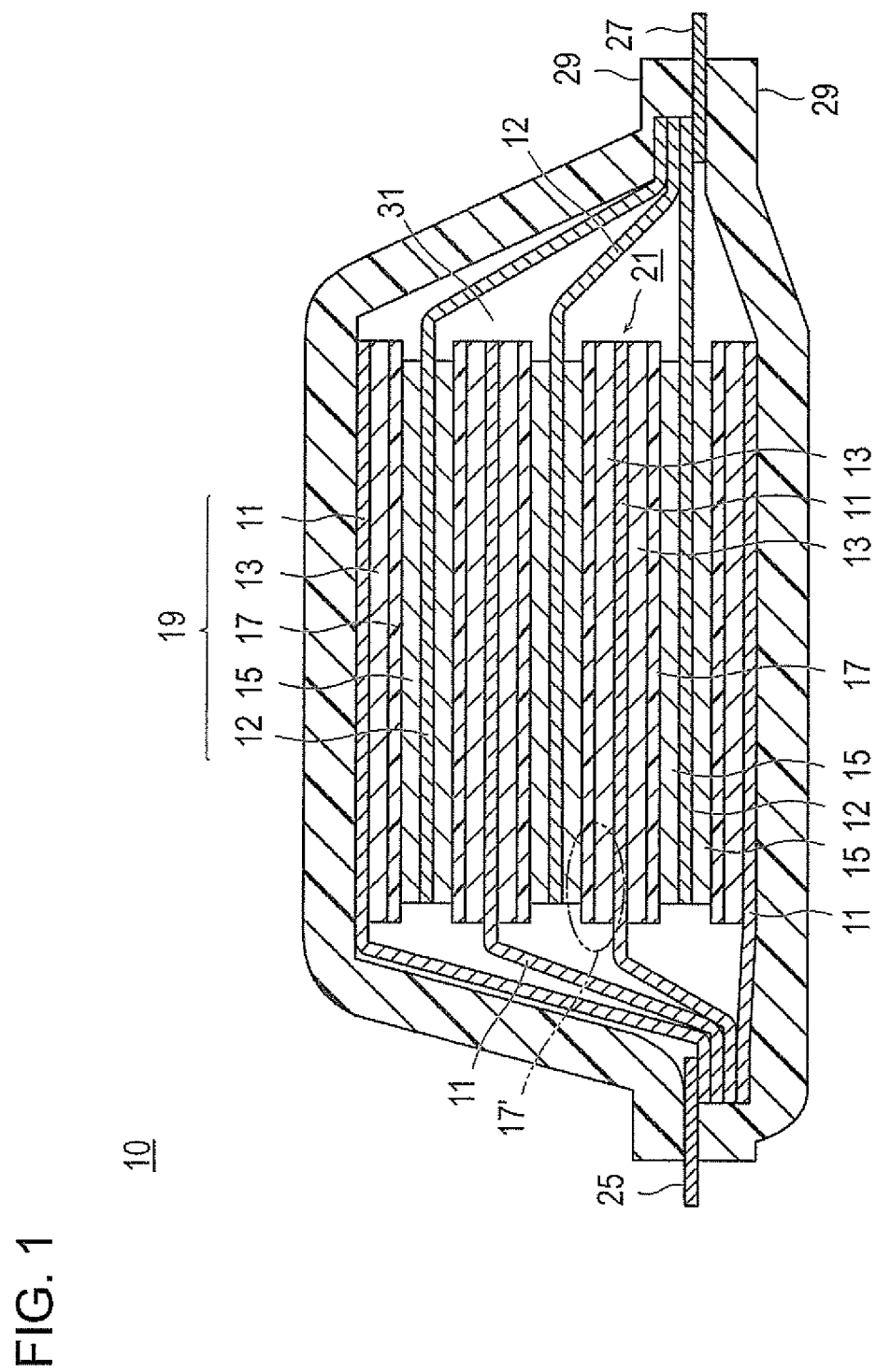
FIG. 1 is a cross-sectional view schematically illustrating the basic constitution of a non-aqueous electrolyte lithium ion secondary battery which is a flat type (stack type) and not a bipolar type, which is one embodiment of an electric device.

The present invention relates to a non-aqueous electrolyte secondary battery obtained by enclosing a power generating element within an outer casing, in which the power generating element includes a positive electrode obtained by forming a positive electrode active material layer on a surface of a positive electrode current collector, a negative electrode obtained by forming a negative electrode active material layer including an aqueous binder on a surface of a negative electrode current collector, a separator for maintaining an electrolytic solution, and a gas releasing means for releasing the gas generated within the power generating element from the inside the outer casing to an extra space, and the ratio value ($V_2/V_1$) of the volume $V_2$ of the extra space to the volume $V_1$ of pores included in the power generating element is 0.5 to 1.0. According to the non-aqueous electrolyte secondary battery according to the present invention, even in the case of using an aqueous binder as a binder for a negative electrode active material layer, the gas generated in the electrode is released to the outside of the power generating element (extra space inside the outer casing) via the gas releasing means. And then, the released gas is sufficiently maintained in the extra space. As a result, it is possible to obtain a non-aqueous electrolyte secondary battery, in which even when using it for a long period of time, the decrease in battery capacity is low.

As described above, an aqueous binder can use water as a solvent when preparing an active material layer, and thus, there are many advantages. In addition, a binding property for binding an active material is high. However, the present inventors found that there was a problem in that when using an aqueous binder for a negative electrode active material layer, the amount of gas generated at the time of initial charge and discharge increased as compared with the negative electrode using an organic solvent-based binder. It is considered that this is because the water of a solvent used at the time of dissolving (dispersing) an aqueous binder remains in an electrode, and is discomposed to be a gas, and thus, it is considered that the amount of gas generated increased as compared with that of an organic solvent-based binder. By such a gas generation, in the case of using an aqueous binder for a negative electrode active material layer, when a battery is used for a long period of time, the discharge capacity of the battery decreases as compared with the initial discharge capacity of the battery. It is considered that this is because the gas remains on an active material layer due to a gas generation, and a SEI coating film is unevenly formed on the surface of a negative electrode.

For a stack-typed laminate battery with several times to several tens of times of the capacity per a unit cell as compared with the civil use, since an electrode is larger in size in order to improve energy density, the amount of gas generated increases more, and furthermore, an uneven reaction occurs on a negative electrode easily.

As a result of enthusiastically performing the review based on the above knowledge, based on the conception that by making the path of gas in a negative electrode active material layer and preparing the mechanism for exhausting the gas which escaped from the active material layer to the outside of a power generating element, the generated gas could be effectively exhausted from a system, the constitution of the present invention was completed. The present invention has a gas releasing means for releasing the gas generated within a power generating element to the outside of the power generating element (specifically, the extra space inside an outer casing). Furthermore, the ratio value ($V_2/V_1$) of the volume $V_2$ of the extra space inside an outer casing to the volume $V_1$ of pores included in the power generating element is controlled to be within the predetermined range. By cooperating these components, the gas generated within a power generating element may be reliably released to the outside of the power generating element (extra space inside an outer casing), and also, the released gas may be sufficiently maintained in the extra space. As a result, the generation of the bad influence generated by the gas generation may be prevented, thereby improving the performance of a battery (especially, durability).

Next, a description will be made of a non-aqueous electrolyte lithium ion secondary battery as a preferred embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the description, and are different from actual ratios in some cases.

Figure 2:
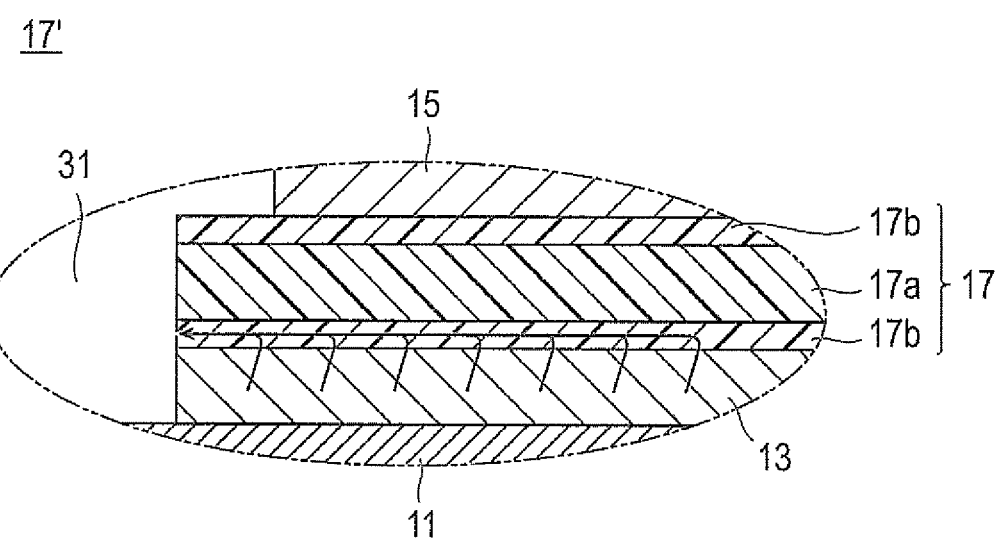
FIG. 2 is a cross-sectional view illustrating the enlarged end of a separator illustrated in FIG. 1.

FIG. 1 is a cross-sectional view schematically illustrating the basic constitution of a non-aqueous electrolyte lithium ion secondary battery which is a flat type (stack type) and not a bipolar type (hereinbelow, it is also simply referred to as a "stack type battery"). As illustrated in FIG. 1, the stack type battery 10 according to this embodiment has a structure in which a power generating element 21 with a substantially rectangular shape, in which a charge and discharge reaction actually occurs, is sealed inside of a battery outer casing material 29. Herein, the power generating element 21 has a constitution in which a positive electrode, the separator 17, and a negative electrode are stacked. Meanwhile, the separator 17 has a non-aqueous electrolyte (for example, liquid electrolyte) therein. The positive electrode has a structure in which the positive electrode active material layer 15 is disposed on both surfaces of the positive electrode current collector 12. The negative electrode has a structure in which the negative electrode active material layer 13 is disposed on both surfaces of the negative electrode current collector 11. Specifically, one positive electrode active material layer 15 and the neighboring negative electrode active material layer 13 are disposed to face each other via the separator 17, and the negative electrode, the electrolyte layer, and the positive electrode are stacked in this order. Accordingly, the neighboring positive electrode, electrolyte layer and negative electrode form one single battery layer 19. It can be also said that, as plural single barrier layers 19 are stacked, the stack type battery 10 illustrated in FIG. 1 has a constitution in which electrically parallel connection is made among them. FIG. 2 is a cross-sectional view illustrating the enlarged end 17' of the separator 17 illustrated in FIG. 1. Here, as illustrated in FIG. 2, the separator 17 of the present embodiment is a separator with a ceramic layer 17b, which is a heat resistant insulating layer and is laminated on at least one surface (both of the surfaces in FIG. 2) of a resin porous substrate 17a. The ceramic layer 17b which is the heat resistant insulating layer includes inorganic particles and a binder. As described above, for the separator 17 having the structure obtained by laminating the ceramic layer 17b as the heat resistant insulating layer, as illustrated in FIG. 2, the ceramic layer 17b functions as a gas releasing means for releasing the gas generated within the power generating element to the extra space inside the outer casing 31 positioned on the outside of the power generating element (the arrow illustrated in FIG. 2). Meanwhile, in the present specification, "the gas releasing means" means the means for releasing the gas to the outside of the power generating element such that the gas generated at the time of charge does not remain within the power generating element at the point of completing the charge.

Meanwhile, on the outermost layer positive electrode current collector which is present on both outermost layers of the power generating element 21, the negative electrode active material layer 13 is disposed only on a single surface. However, an active material layer may be formed on both surfaces. Namely, not only a current collector exclusive for an outermost layer in which an active material layer is formed on a single surface can be achieved but also a current collector having an active material layer on both surfaces can be directly used as a current collector of an outermost layer. Furthermore, by reversing the arrangement of the positive electrode and negative electrode of FIG. 1, it is also possible that the outer most layer positive electrode current collector is disposed on both outermost layers of the power generating element 21 and a positive electrode active material layer is disposed on a single surface or both surfaces of the same outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to the end part of the battery outer casing material 29 so as to be led to the outside of the battery outer casing material 29. If necessary, each of the positive electrode current collecting plate 27 and negative electrode current collecting plate 25 can be attached, via a positive electrode lead and negative electrode lead (not illustrated), to the positive electrode current collector 12 and negative electrode current collector 11 of each electrode by ultrasonic welding or resistance welding.

Meanwhile, although a stack type battery which is a flat type (stack type), not a bipolar type is illustrated in FIG. 1, it can be also a bipolar type battery containing a bipolar type electrode which has a positive electrode active material layer electrically bound to one surface of a current collector and a negative electrode active material layer electrically bound to the opposite surface of the current collector. In that case, one current collector plays both roles of a positive electrode current collector and a negative electrode current collector.

Hereinbelow, each member is described in more detail.

[Negative Electrode Active Material Layer]

The negative electrode active material layer contains a negative electrode active material. Examples of the negative electrode active material include a carbon material such as graphite (graphite), soft carbon, and hard carbon, a lithium-transition metal composite oxide (for example, $Li_4Ti_5O_{12}$), a metal material, and a lithium alloy-based negative electrode material. If necessary, two or more kinds of a negative electrode active material may be used in combination. Preferably, from the viewpoint of capacity and output characteristics, a carbon material or a lithium-transition metal composite oxide is used as a negative electrode active material. Meanwhile, it is needless to say that a negative electrode active material other than those described above can be also used.

The average particle size of each active material contained in the negative electrode active material layer is, although not particularly limited, preferably 1 to 100 μm, and more preferably 1 to 30 μm from the viewpoint of having high output.

The negative electrode active material layer includes at least an aqueous binder. Meanwhile, the aqueous binder has an advantage of lowering a burden on environment and greatly suppressing an investment on facilities of a production line, since water as a raw material is conveniently available and only water vapor is generated during drying.

The aqueous binder indicates a binder with which water is used as a solvent or a dispersion medium, and specific examples thereof include a thermoplastic resin, a polymer with rubber elasticity, a water soluble polymer, and a mixture thereof. Herein, the binder with which water is used as a dispersion medium includes all expressed as latex or an emulsion, and it indicates a polymer emulsified in water or suspended in water. Examples thereof include polymer latexes obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, ethylene-propylene copolymer, polybutadiene, butyl rubber, fluororubber, polyethylene oxide, polyepichlorohydrin, polyphosphagen, polyacrylonitrile, polystyrene, ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4,000, and more preferably 1,000 to 3,000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch, and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, copolymer of (meth)acrylamide and/or (meth)acrylic acid salt [(meth)acrylamide polymer, (meth)acrylamide-(meth) acrylic acid salt copolymer, alkyl (meth) acrylic acid (carbon atom number of 1 to 4) ester-(meth) acrylic acid salt copolymer, or the like], styrene-maleic acid salt copolymer, mannich modified product of polyacrylamide, formalin condensation type resin (urea-formalin resin, melamin-formalin resin or the like), polyamidepolyamine or dialkylamine-epichlorohydrin copolymer, polyethyleneimine, casein, soybean protein, synthetic protein, and a water soluble polymer such as galactomannan derivatives. The aqueous binder can be used either singly or in combination of two or more types.

From the viewpoint of a binding property, the aqueous binder preferably contains at least one rubber-based binder which is selected from the group consisting of a styrene-butadiene rubber, an acrylonitrile-butadiene rubber, a methyl methacrylate-butadiene rubber, and a methyl methacrylate rubber. In addition, in the viewpoint of a good binding property, an aqueous binder preferably includes a styrene-butadiene rubber.

When a styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose are preferably combined as a binder. The mass ratio of the contents of the styrene-butadiene rubber and water-soluble polymer is not particularly limited, but is preferably the styrene-butadiene rubber:water-soluble polymer=1:0.3 to 1:0.7.

Among the binders used for a negative electrode active material layer, the content of an aqueous binder is preferably 80 to 100% by mass, preferably 90 to 100% by mass, and preferably 100% by mass. As a binder other than the aqueous binder, there may be a binder used for a positive electrode active material layer as described below.

The binder amount contained in the negative electrode active material layer is not particularly limited, as long as the binder can bind the active material. Preferably, it is 0.5 to 15% by mass, more preferably 1 to 10% by mass, and more preferably 2 to 4% by mass relative to the active material layer. Furthermore, because of a high binding power, the aqueous binder can form the active material layer, even with addition of a small amount compared to an organic solvent-based binder. Accordingly, the content of an aqueous binder contained in the negative electrode active material layer is, relative to the active material layer, preferably 0.5 to 15% by mass, more preferably 1 to 10% by mass, and even more preferably 2 to 4% by mass.

If necessary, the negative electrode active material layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active material layer or negative electrode active material layer. As the conductive aid, for example, there can be mentioned carbon black including acetylene black; graphite; and carbon materials such as carbon fiber. When the active material layer contains a conductive aid, an electron network is formed effectively in the inside of the active material layer, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the negative electrode active material layer and positive electrode active material layer described below is not particularly limited. The blending ratio can be adjusted by suitably referring the already-known knowledge about a lithium ion secondary battery. The thickness of each active material layer is not particularly limited either, and reference can be made to the already-known knowledge about a battery. For example, the thickness of each active material layer is about 2 to 100 μm.

In the present invention, the density of the negative electrode active material layer is preferably 1.4 to 1.6 $g/cm^3$. When the density of a negative electrode active material layer is 1.6 $g/cm^3$ or less, the generated gas can be sufficiently released from the inside of a power generating element so that the long-term cycle characteristics can be further improved. In addition, when the density of a negative electrode active material layer is 1.4 $g/cm^3$ or more, the connectivity of an active material is ensured to fully maintain the electron conductivity, and as a result, the battery performance can be further enhanced. The density of the negative electrode active material layer is preferably 1.35 to 1.65 $g/cm^3$, and more preferably 1.42 to 1.53 $g/cm^3$, from the viewpoint of more exhibiting the effect of the present invention. Meanwhile, the density of the negative electrode active material layer refers to the mass of the active material layer per a unit volume. Specifically, after collecting the negative electrode active material layer from a battery and removing the solvent or the like which is present in the electrolyte liquid, the electrode volume is obtained from width, length, and height, weight of the active material layer is measured, and the weight is divided by volume to obtain the density.

Furthermore, in the present invention, it is preferable that the surface average center line roughness (Ra) on a separator-side surface of the negative electrode active material layer is 0.5 to 1.0 μm. When the negative electrode active material layer has average center line roughness (Ra) of 0.5 μm or more, the long-term cycle characteristics can be further improved. It is believed to be due to the reason that, when the surface roughness is 0.5 μm or more, the gas generated within the power generating element can be easily released to outside of the system. Furthermore, when the average center line roughness (Ra) of the negative electrode active material layer is 1.0 μm or less, the electron conductivity in a battery element can be obtained at sufficient level so that the battery characteristics can be further improved.

As described herein, the average center line roughness Ra is a value expressed in micrometer (μm) which is obtained by the following Formula 1 (JIS-B0601-1994), when only the reference length in the direction of average line is subtracted from a roughness curve, x axis is taken in the direction of the average line in the subtracted part, y axis is taken in the direction of vertical magnification, and the roughness curve is expressed as y=f(x).

$$Ra = \frac{1}{\ell} \int_0^\ell |f(x)| dx \qquad \text{[Formula 1]}$$

Ra value can be measured by using a probe type or a non-contact type surface roughness measurement device that is widely used in general, based on the method described in JIS-B0601-1994 or the like. There is no limitation regarding a manufacturer or mode of the apparatus. For the determination in the present invention, Model No. Dektak3030 made by SLOAN Corporation was used, and with a device for analyzing the roughness (which is attached to the apparatus), Ra was obtained based on the method prescribed in JIS-B0601. Although the measurement can be made by any one of the contact type (probe type using a diamond needle or the like) and non-contact type (non-contact detection using laser beam or the like), the measurement was made in the present invention according to the contact type method.

Furthermore, as it can be measured relatively easily, the surface roughness Ra defined in the present invention is measured at a stage in which an active material layer is formed on a current collector during the manufacturing process. However, the measurement can be made even after the completion of a battery, and as it gives almost the same result as that obtained during the production process, it is sufficient that the surface roughness after completion of the battery satisfies the above Ra range. In addition, the surface roughness of a negative electrode active material layer indicates the roughness on a separator side of the negative electrode active material layer.

The surface roughness of a negative electrode can be controlled to be within the aforementioned range by adjusting, for example, the press pressure for forming an active material layer while considering the shape and particle size of an active material which is included in the negative electrode active material layer, and blending amount of an active material or the like. The shape of the active material varies depending on the type or production method, or the like. The shape control can be made by crushing or the like. Examples of the shape include a spherical (powder) shape, a plate shape, a needle shape, a column shape, and a prism shape. Thus, considering the shape employed for an active material layer, various active materials can be combined to control the surface roughness.

In addition, in the present invention, as a preferable embodiment of a case where a negative electrode active material layer has a rectangular shape, the cross sectional area of the pore for the cross section in the laminating direction of the power generating element that is parallel to the short side of the rectangle that is the projection shape of the negative electrode active material layer is preferably larger than the cross sectional area of the pore for the cross section in the laminating direction of the power generating element that is parallel to the long side of the rectangle. By having such a constitution, it is secured to have the path of a gas in the direction of the long side of the negative electrode active material layer in which the gas is more difficult to escape, and thus, the releasing property of the gas may be more improved.

Here, the embodiment illustrated in FIG. 1 has the constitution in which the ceramic layer of the separator functions as "a gas releasing means", wherein the separator has the structure obtained by laminating the ceramic layer as the heat resistant insulating layer. However, it is possible to employ other constitutions as a gas releasing means. For example, there may be a form of having a gas path for passing through the gas generated on the surface of the separator of the negative electrode active material layer. In addition, even when the separator consisted of only a resin porous substrate without a ceramic layer is used, the same gas path may be made on the surface of the negative electrode active material layer of the separator.

[Positive Electrode Active Material Layer]

The positive electrode active material layer contains an active material, and if necessary, it further contains other additives such as a conductive aid, a binder, an electrolyte (for example, polymer matrix, ion conductive polymer, and electrolyte liquid), and lithium salt for enhancing ion conductivity.

The positive electrode active material layer contains a positive electrode active material. Examples of the positive electrode active material include a lithium-transition metal composite oxide such as $LiMn_2O_4$, $LiCoO_2$, $LiNiO_2$, $Li(Ni-Mn-Co)O_2$, a lithium-transition metal phosphate compound, and a lithium-transition metal sulfate compound, or a compound in which part of the transition metals is replaced with other element. Depending on the case, two or more kinds of a positive electrode active material can be used in combination. As a preferred example, a lithium-transition metal composite oxide is used as a positive electrode active material from the viewpoint of capacity and output characteristics. As a more preferred example, $Li(Ni-Mn-Co)O_2$ and a compound in which part of the transition metals is replaced with other element (hereinbelow, also simply referred to as the "NMC composite oxide") are used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel lithium manganese oxide, that is, as the supply power is two times higher, it can have high capacity.

As described above, the NMC composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Co, d represents the atomic ratio of Mn, and x represents the atomic ratio of M. From the viewpoint of the cycle characteristics, it is preferable that $0.4 \leq b \leq 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by other metal element, and it is preferable that $0 < x \leq 0.3$ in General Formula (1), in particular. By dissolving at least one selected from the group consisting of Ti, Zr, Nb, W, P, Al, Mg, V, Ca, Sr and Cr, the crystal structure is stabilized so that a decrease in capacity of a battery is prevented even after repeated charge and discharge, and thus, it is believed that excellent cycle characteristics can be achieved.

As a more preferred embodiment, b, c, and d in General Formula (1) satisfy $0.44 \leq b \leq 0.51$, $0.27 \leq c \leq 0.31$, and $0.19 \leq d \leq 0.26$ from the viewpoint of improving balance between capacity and durability.

Meanwhile, it is needless to say that a positive electrode active material other than those described above can be also used.

The average particle size of each active material which is contained in the positive electrode active material layer is, although not particularly limited, preferably 1 to 100 and more preferably 1 to 20 μm from the viewpoint of having high output.

A binder used for the positive electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFT-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene fluorine-based fluorine rubber (VDF-CTFE-based fluorine rubber), an epoxy resin, and the like. These binders may be each used singly, or two or more thereof may be used in combination.

The amount of binder included in the positive electrode active material layer is not particularly limited as long as it can bind an active material, but preferably, 0.5 to 15% by mass and more preferably 1 to 10% by mass with respect to the active material layer.

With regard to other additives other than the binder, those described for the above negative electrode active material layer can be also used.

[Separator (Electrolyte Layer)]

A separator has an activity of maintaining an electrolyte to ensure lithium ion conductivity between a positive electrode and a negative electrode and also a function of a partition wall between a positive electrode and negative electrode.

In the present invention, the releasing property of the gas generated within the power generating element is improved by having a gas releasing means in the power generating element and also controlling the value of $V_2/V_1$. However, in order to further improve the gas releasing property from the power generating element, the releasing property of the gas that escaped from the negative electrode active material layer and reaches to the separator is preferably considered. From such a viewpoint, it is more preferable that the air permeability and porosity of the separator is adjusted to a suitable range.

Specifically, the air permeability (Gurley value) of the separator is preferably 200 (second/100 cc) or less. As the air permeability (Gurley value) of the separator is preferably 200 (second/100 cc) or less, the release of the generated gas is improved so that the battery can have good capacity retention rate after cycles and can have sufficient short-circuit preventing property and also sufficient mechanical properties as a function of the separator. Although the lower limit of the air permeability is not particularly limited, it is generally 300 (second/100 cc) or more. The air permeability of the separator is a value measured by the method of JIS P8117 (2009).

Furthermore, the preferable porosity of the separator is 40 to 65%. As the porosity of the separator is 40 to 65%, the releasing property of the generated gas is improved so that the battery can have good long-term cycle characteristics and can have sufficient short-circuit preventing property and also sufficient mechanical properties as a function of the separator. Meanwhile, as for the porosity, a value obtained as a volume ratio from the density of a raw material resin of a separator and the density of a separator as a final product is used. For example, when the density of a raw material resin is $\rho$ and volume density of a separator is $\rho'$, it is described as follows: porosity=$100\times(1-\rho'/\rho)$.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a monolayer or a multilayer. Fine pore diameter of the microporous (microporous membrane) separator is preferably 1 µm or less at most (in general, the pore diameter is about several tens of nanometer).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated polymer gel electrolyte. Furthermore, the thickness of a separator composed of non-woven fabric can be the same as the thickness of an electrolyte layer, and it is preferably 5 to 200 µm and particularly preferably 10 to 100 µm.

Herein, as described above with reference to FIG. 1, the separator can be a separator having a heat resistant insulating layer laminated on at least one surface of a resin porous substrate. The heat resistant insulating layer is a ceramic layer containing inorganic particles and a binder. By having a heat resistant insulating layer, internal stress in a separator which increases under temperature increase is alleviated so that the effect of inhibiting thermal shrinkage can be obtained. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating an electric device.

As described above, in the separator having the structure obtained by laminating a ceramic layer as a heat resistant insulating layer, the ceramic layer functions as a gas releasing means for releasing the gas generated within the power generating element to the outside of the power generating element.

As described above, the separator also contains an electrolyte. The electrolyte is not particularly limited as long as it can exhibit those functions, and a liquid electrolyte or a gel polymer electrolyte is used.

The liquid electrolyte has an activity of a lithium ion carrier. The liquid electrolyte has the form in which lithium salt is dissolved in an organic solvent. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between each layer is blocked. Examples of an ion conductive polymer which is used as a matrix polymer (host polymer) include polyethylene oxide (PEO), polypropylene oxide (PPO), and a copolymer thereof. An electrolyte salt such as lithium salt can be dissolved well in those polyalkylene oxide polymers.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

[Current Collector]

The material for forming a current collector is not particularly limited, but metal is preferably used.

Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can be also a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. The thickness of the current collector is not particularly limited, either. The thickness of the current collector is generally about 1 to 100 µm.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal material such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 27 and the negative electrode current collecting plate 25.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led out from a casing is preferably coated with a heat resistant and insulating thermally shrunken tube or the like so that it has no influence on a product (for example, an automobile component, in particular, an electronic device or the like) by electric leak after contact with neighboring instruments or wirings.

[Battery Outer Casing]

As for the battery outer casing 29, an envelope-shaped casing to cover a power generating element, in which a laminate film including aluminum is contained, can be used as a member for enclosing a power generating element within it. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled, a laminate film containing aluminum for an outer casing is more preferred.

The internal volume of the battery outer casing 29 is designed to be larger than the volume of the power generating element 21 such that it can enclose the power generating element 21. Herein, the internal volume of an outer casing indicates the volume inside an outer casing before performing a vacuum treatment after sealing the outer casing. Furthermore, the volume of the power generating element means the volume which is spatially taken by the power generating element, and it include the pore part in the power generating element. As the internal volume of an outer casing is larger than the volume of the power generating element, a space for collecting gas at the time of gas generation can be present. Accordingly, the gas release property from the power generating element is enhanced and it is less likely that the battery behavior is affected by the generated gas, and therefore the battery characteristics are improved.

In addition, in the present embodiment, it is constituted to be 0.5 to 1.0 of the ratio value ($V_2/V_1$) of the volume $V_2$ of the extra space inside the battery outer casing 29 to the volume $V_1$ of the pore included in the power generating element 21. By such a constitution, it may be contributed to further improve the gas releasing property from the power generating element, and especially, to improve the property of long period cycle of a battery. Herein, "the volume of the pore included in the power generating element" is the sum of pores included in each of the constitution members constituting the power generating element, and may be calculated from the density of an electrode, the true density of each of constitution members, and the basis weight of an electrode. In addition, a battery is generally manufactured by enclosing a power generating element within an outer casing, injecting an electrolytic solution therein, and then, sealing the inside the outer casing by a vacuum-aspiration. In this state, when a gas is generated within the outer casing and there is the space where the generated gas can be gathered within the outer casing, the generated gas is gathered in the space, and thereby, the outer casing expands. Such a space is defined as "an extra space" in the present specification, and the volume of the extra space when expanding at the maximum without the break of outer casing is defined as $V_2$. As described above, the value of $V_2/V_1$ is essential to be 0.5 to 1.0, but preferably 0.6 to 0.9 and more preferably 0.7 to 0.8.

Meanwhile, as a preferable embodiment of the invention, it is preferable that the aforementioned extra space which is present inside the outer casing is disposed at least vertically above the power generating element. By having this constitution, the generated gas can be concentrated at a site vertically above the power generating element in which an extra space is present. Accordingly, compared to a case in which an extra space is present in a lateral part or a bottom part of the power generating element, the electrolyte liquid can be firstly present in a bottom part in which the power generating element is present inside the outer casing. As a result, a state in which the power generating element is constantly soaked in as large amount of electrolyte liquid as possible can be obtained, and thus lowered battery performance accompanied with liquid depletion can be suppressed to a minimum level. Meanwhile, although there is no specific limitation on the constitution to have an extra space present vertically above the power generating element, for example, it is possible that the material or shape of an outer casing itself is constituted such that no swelling occurs toward the lateral part or bottom part of the power generating element, or a member for preventing the swelling of an outer casing toward the lateral part or bottom part can be disposed on the outside of an outer casing.

In addition, as described above, a power generating element is enclosed within an outer casing at the time of manufacturing a battery, and then, an electrolytic solution is injected. For the preferred embodiment of the present invention, the ratio value of the volume of the electrolytic solution injected to the volume of the above-described extra space is controlled to be within the predetermined range. In detail, the value $((L-V_1)/V_2)$ of the difference between the volume (L) of the electrolytic solution injected into the outer casing to the volume $V_1$ of pores included in the power generating element to the volume $(V_2)$ of the extra space inside the outer casing is preferably 0.4 to 0.7. The value of $(L-V_1)/V_2$ is preferably 0.45 to 0.65, and more preferably 0.50 to 0.60. When the value of $(L-V_1)/V_2$ is the value within such a range, the liquid depletion of the electrolytic solution may be prevented, and thus, the effect on inhibiting the uneven battery reaction may be more significantly exhibited.

For an application for an automobile or the like, a battery with large size is required in these days. In addition, the effect of the present invention to effectively exhaust the gas generated to the outside thereof is more effectively exhibited in the case of a large-area battery, in which the amount of gas generated is large. Thus, in the present invention, a battery structure having a power generating element covered with an outer casing preferably has large size from the viewpoint of better exhibition of the effect of the present invention. Specifically, it is preferable that the negative electrode active material layer has a rectangular shape in which the short side length is 100 mm or more. Such battery with large size can be used for an application in automobile. Herein, the short side length of a negative electrode active material layer indicates the length of the shortest side in each electrode. Herein, the upper limit of a length of a short side is, although not particularly limited, generally 250 mm or less.

It is also possible to determine the large size of a battery in view of a relationship between battery area or battery capacity, from the viewpoint of a large-size battery, which is different from a physical size of an electrode. For example, in the case of a flat and stack type laminate battery, the ratio value of a battery area (projected area of a battery including an outer casing of the battery) to rated capacity is 5 $cm^2$/Ah or more, and for a battery with rated capacity of 3 Ah or more, the battery area per unit capacity is large so that the amount of gas generated increases and uneven forming of a coating film (SEI) on a surface of the negative electrode active material is promoted easily. For such reasons, a problem of having lowered battery characteristics (in particular, service life characteristics after long-term cycle) may become more significant for a battery in which an aqueous binder such as SBR is used for forming a negative electrode active material layer. The non-aqueous electrolyte secondary battery according to this embodiment is preferably a large-size battery as described above from the viewpoint of having a larger merit by exhibition of the working effects of the present invention. Furthermore, the aspect ratio of a rectangular electrode is preferably 1 to 3, and more preferably 1 to 2. Meanwhile, the aspect ratio of an electrode is defined by a horizontal to vertical ratio of the positive electrode active material layer with a rectangular shape. By having the aspect ratio in this range, an advantage of further suppressing an occurrence of uneven film can be obtained according to the present invention in which use of an aqueous binder is essential, as the gas can be evenly released in plane direction.

[Group Pressure Applied on Power Generating Element]

In the present invention, the group pressure applied on the power generating element is preferably 0.07 to 0.7 $kgf/cm^2$ (6.86 to 68.6 kPa). By applying pressure to a power generating element to have the group pressure of 0.07 to 0.7 $kgf/cm^2$, the gas can be released better to an outside of the system, and also as extra electrolyte liquid in the battery does not much remain between the electrodes, and thus an increase in cell resistance can be suppressed. In addition, as the battery swelling is suppressed, good cell resistance and capacity retention rate after long-term cycle are obtained. More preferably, the group pressure applied to the power generating element is 0.1 to 0.7 $kgf/cm^2$ (9.80 to 68.6 kPa). Herein, the group pressure indicates an external force applied to a power generating element. The group pressure applied to a power generating element can be easily measured by using a film type pressure distribution measurement system. In the present specification, the value measured by using the film type pressure distribution measurement system manufactured by tekscan is used.

Although it is not particularly limited, control of the group pressure can be made by applying directly or indirectly external force to a power generating element by physical means, and controlling the external force. As for the method for applying external force, it is preferable to use a pressure member which can apply pressure on an outer casing. Namely, one preferred embodiment of the present invention is a non-aqueous electrolyte secondary battery which further has a pressure member for applying pressure on an outer casing such that the group pressure applied on the power generating element is 0.07 to 0.7 $kgf/cm^2$.

Figure 3A:
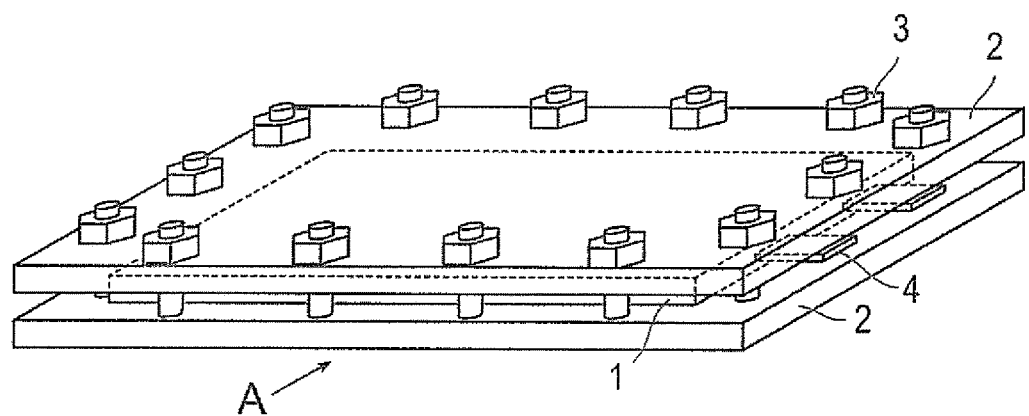
FIG. 3(A) is a plane view of the non-aqueous electrolyte secondary battery according to a preferable embodiment of the present invention.
Figure 3B:
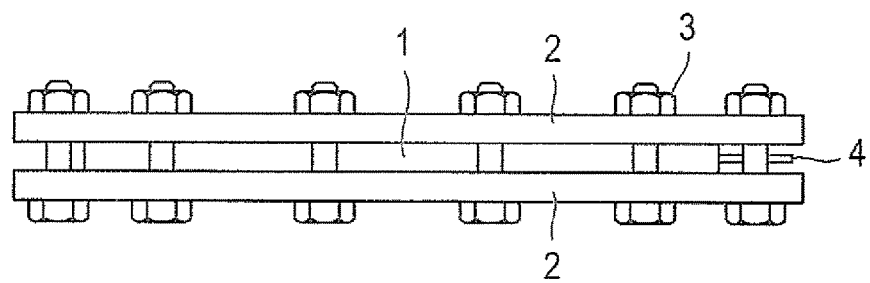
FIG. 3(B) is a diagram viewed from the arrow A of FIG. 3(A).

FIG. 3(A) is a top view of a non-aqueous electrolyte lithium ion secondary battery as another preferred embodiment of the present invention and FIG. 3(B) is a diagram seen from the arrow direction of A in FIG. 3(A). The outer casing with the enclosed power generating element 1 has a flat rectangular shape, and the electrode tab 4 is drawn from the lateral side of the outer casing for extracting electric power. The power generating element is covered by the battery outer casing with its periphery fused by heat. The power generating element is sealed in a state in which the electrode tab is led to the outside. Herein, the power generating element corresponds to the power generating element 21 of the lithium ion secondary battery 10 illustrated in FIG. 1 as described above. In FIGS. 3A and 3B, 2 represents a SUS plate as a pressure member, 3 represents a fixing jig as a fixing member, and 4 represents an electrode tab (negative electrode tab or positive electrode tab). The pressure member is disposed for the purpose of controlling the group pressure applied to power generating element to 0.07 to 0.7 kgf/cm$^2$. Examples of the pressure member include a rubber material such as urethane rubber sheet, a metal plate such as aluminum and SUS. Furthermore, from the viewpoint of having continuous application of constant pressure on a power generating element by a pressure member, it is preferable to provide a fixing means with a spring property for fixing a pressure member. Furthermore, by controlling the fixing of a fixing jig onto a pressure member, the group pressure applied to a power generating element can be easily controlled.

Meanwhile, drawing of the tab illustrated in FIGS. 3A and 3B is not particularly limited, either. The positive electrode tab and the negative electrode tab may be drawn from two lateral sides, or each of the positive electrode tab and negative electrode tab may be divided into plural tabs and drawn from each side, and thus it is not limited to the embodiment illustrated in FIGS. 3A and 3B.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source for operating a vehicle requiring high volume energy density and high volume output density or an auxiliary power source, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The electric device has excellent output characteristics and can maintain discharge capacity even when it is used for a long period of time, and thus has good cycle characteristics. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. Thus, the electric device can be preferably used as a power source for a vehicle, for example, as a power source for operating a vehicle or as an auxiliary power source.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Hereinbelow, a description is made in greater detail in view of examples and comparative examples, but the present invention is not limited to the examples given below.

Example 1

1. Preparation of Electrolyte Liquid

A mixed solvent of ethylene carbonate (EC), ethylmethyl carbonate (EMC), and diethyl carbonate (DEC) (volume ratio of 30:30:40) was prepared as a solvent. In addition, 1.0 M LiPF$_6$ was prepared as a lithium salt. In addition, 2% by mass of vinylene carbonate was added to total 100% by mass of the lithium salt and the solvent to prepare an electrolyte liquid. Meanwhile, the expression "1.0 M LiPF$_6$" means that the lithium salt (LiPF$_6$) concentration is 1.0 M in the mixture of the mixture of solvent and lithium salt.

2. Production of Positive Electrode

Solid matter composed of 85% by mass of LiMn$_2$O$_4$ (average particle size: 15 μm) as a positive electrode active material, 5% by mass of acetylene black as a conductive aid, and 10% by mass of PVdF as a binder was prepared. Then, a suitable amount of N-methyl-2-pyrrolidone (NMP) as a solvent for controlling slurry viscosity was added to the solid matter to prepare a slurry of positive electrode active material. Then, the obtained positive electrode slurry was coated on both surfaces of an aluminum foil (20 μm) as a current collector followed by drying and press to produce a positive electrode in which the coating amount on a single surface of positive electrode active material layer is 18 mg/cm$^2$ and the thickness on both surfaces is 157 μm (including the foil). The density of the positive electrode active material layer was 2.95 g/cm$^3$.

3. Production of Negative Electrode

Solid matter composed of 95% by mass of artificial graphite (average particle size: 20 μm) as a negative electrode active material, 2% by mass of acetylene black as a conductive aid, 2% by mass of SBR and 1% of CMC as a binder was prepared. Then, a suitable amount of ion exchange water as a solvent for controlling slurry viscosity was added to the solid matter to prepare a slurry of negative electrode active material. Then, the obtained negative electrode slurry was coated on both surfaces of a copper foil (15 μm) as a current collector followed by drying and press to produce a negative electrode in which the coating amount on a single surface of negative electrode active material layer is 5.1 mg/cm² and the thickness of both of the surfaces is 87 μm (including the foil). Furthermore, the density of the negative electrode active material layer was 1.48 g/cm³.

4. Process for Producing Single Battery

The positive electrode which has been prepared above was cut to have a rectangular shape of 210×184 mm and the negative electrode was cut to have a rectangular shape of 215×188 mm (15 pieces of positive electrode and 16 pieces of negative electrode). Those positive electrodes and negative electrodes were alternately laminated mediated by a separator of 219×191 mm (polypropylene microporous membrane, thickness of 25 μm, and porosity of 55%) to produce a power generating element. The rated capacity of the battery produced as described above was 14.6 Ah, and the ratio of the battery area to the rated capacity was 34.8 cm²/Ah. Here, the rated capacity of the battery was obtained as follows.

<<Measurement of Rated Capacity>>

For measurement of rated capacity, a battery for test was injected with an electrolyte solution, allowed to stand for 10 hours or so, and subjected to initial charge. After that, the measurement was carried out according to the following step 1 to 5 at temperature of 25° C., in the voltage range of 3.0 V to 4.1 V.

Step 1: After reaching 4.1 V by constant current charge at 1 C, it was rested for 5 minutes.

Step 2: After Step 1, it was charged for 1.5 hours by constant voltage charge followed by resting for 5 minutes.

Step 3: After reaching 3.0 V by constant current discharge at 1 C, it was discharged for 2 hours by constant voltage discharge followed by resting for 10 seconds.

Step 4: After reaching 4.1 V by constant current charge at 1 C, it was charged for 2.5 hours by constant voltage charge followed by resting for 10 seconds.

Step 5: After reaching 3.0 V by constant current discharge at 0.5 C, it was discharged for 2 hours by constant voltage discharge followed by resting for 10 seconds.

Rated capacity: The discharge capacity (CCCV discharge capacity) from the constant current discharge to constant voltage discharge of Step 5 is used as rated capacity.

The tabs were welded on the positive electrode and negative electrode, respectively, and the positive electrode and negative electrode along with an electrolytic solution were sealed in the outer casing constituted of an aluminum laminate film to complete a battery. Then, the battery was inserted between an urethane rubber sheet (thickness: 3 mm) and Al plate (thickness: 5 mm), which have the area larger than the area of the battery, and then, the pressing was performed so as to be a group pressure as listed in the following Table 1 to complete a single battery. Meanwhile, the volume ($V_1$) of the pore included in the power generating element manufactured as described above was calculated by the calculation, and thus, was 20.0 cm³.

Examples 2 to 6 and Comparative Example 1

The batteries were manufactured in the same method as Example 1, except that the amount (L) of the electrolytic solution injected into the outer casing and the ratio value ($V_2/V_1$) of the volume $V_2$ of the extra space inside the outer casing to the $V_1$ were changed into the values as listed in the following Table 1, and the pressing was performed so as to be the group pressure of the outer casing listed in the following Table 1.

(Evaluation of Battery)

1. Process for Initial Charge and Discharge of Single Battery

The non-aqueous electrolyte secondary battery (single battery) produced as above was evaluated according to a charge and discharge performance test. For the charge and discharge performance test, the battery was kept for 24 hours in an incubator at 25° C. for performing initial charge. For the initial charge, constant current charge (CC) was performed at current value of 0.05 CA until 4.2 V followed by constant voltage (CV), thus it was charged for 25 hours in total. After that, it was kept for 96 hours in an incubator at 40° C. After that, it was discharged to 2.5 V at current rate of 1 C in an incubator at 25° C., followed by resting time for 10 minutes.

2. Evaluation of Battery

Subsequently, the performance test was performed after having the battery temperature of 45° C. by using an incubator kept at 45° C. For the charge, constant current charge (CC) was performed at current value of 1 C until 4.2 V followed by constant voltage (CV), thus it was charged for 2.5 hours in total. Then, after having resting time for 10 minutes, it was discharged to 2.5 V at current rate of 1 C followed by resting time for 10 minutes. The charge and discharge test was performed by having them as one cycle. For the initial discharge capacity, the discharge rate after 300 cycles was defined as a capacity retention rate. The results are listed in the following Table 1. Meanwhile, the value of the capacity retention rate listed in Table 1 is the relative value when the value of the capacity retention rate of Comparative Example 1 is defined as 100.

TABLE 1

|  | Amount of electrolytic solution L (cm³) | Pore volume of power generating element $V_1$ (cm³) | $V_2/V_1$ | $(L-V_1)/V_2$ | Porosity of separator (%) | Group pressure of outer casing (kgf/cm²) | Capacity retention rate (relative value) |
|---|---|---|---|---|---|---|---|
| Example 1 | 83.6 | 63.3 | 0.8 | 0.40 | 50 | 0.15 | 111 |
| Example 2 | 78.5 | 63.3 | 0.6 | 0.40 | 50 | 0.15 | 108 |
| Example 3 | 86.1 | 63.3 | 0.6 | 0.60 | 50 | 0.15 | 109 |
| Example 4 | 86.1 | 63.3 | 0.6 | 0.60 | 60 | 0.70 | 111 |
| Example 5 | 94.3 | 63.3 | 0.7 | 0.70 | 40 | 0.15 | 107 |
| Example 6 | 85.5 | 63.3 | 0.5 | 0.70 | 40 | 0.15 | 105 |
| Comparative Example 1 | 80.4 | 63.3 | 0.3 | 0.90 | 55 | 0 | 100 |

From the results listed in Table 1, it can be confirmed that as compared with the battery of Comparative Example 1, the capacity retention rates, after the cycles for a long period of time, of the batteries of Examples 1 to 6 are higher.

The invention claimed is:

1. A non-aqueous electrolyte secondary battery having a power generating element enclosed within an outer casing, wherein the power generating element has a positive electrode obtained by forming a positive electrode active material layer on a surface of a positive electrode current collector, a negative electrode obtained by forming a negative electrode active material layer comprising an aqueous binder on a surface of a negative electrode current collector, a separator for maintaining an electrolyte liquid, and a gas releasing means for releasing a gas generated within the power generating element to an extra space inside the outer casing, and the ratio value of a volume of the extra space to a volume of pores included in the power generating element is 0.5 to 1.0.

2. The non-aqueous electrolyte secondary battery according to claim 1, wherein the separator comprises a ceramic layer comprising inorganic particles and a binder on at least one surface of a resin porous substrate and the gas releasing means is the ceramic layer.

3. The non-aqueous electrolyte secondary battery according to claim 1, wherein the ratio value of a difference between a volume of the electrolytic solution injected into the outer casing and the volume of pores included in the power generating element, to a volume of the extra space inside the outer casing is 0.4 to 0.7.

4. The non-aqueous electrolyte secondary battery according to claim 1, wherein the extra space inside the outer casing is disposed at least vertically above the power generating element.

5. The non-aqueous electrolyte secondary battery according to claim 1, wherein the negative electrode active material layer has a rectangular shape, and a cross sectional area of pores for a cross section in a laminating direction of the power generating element that is parallel to a short side of the rectangle is larger than a cross sectional area of pores for a cross section in a laminating direction of the power generating element that is parallel to a long side of the rectangle.

6. The non-aqueous electrolyte secondary battery according to claim 1, wherein the negative electrode active material layer has a rectangular shape in which the short side length of the rectangle is 100 mm or more.

7. The non-aqueous electrolyte secondary battery according to claim 1, wherein the ratio value of a battery area (projected area of a battery including an outer casing of the battery) to rated capacity is 5 $cm^2$/Ah or more and the rated capacity is 3 Ah or more.

8. The non-aqueous electrolyte secondary battery according to claim 1, wherein the aspect ratio of an electrode defined as a horizontal to vertical ratio of the positive electrode active material layer with a rectangular shape is 1 to 3.

9. The non-aqueous electrolyte secondary battery according to claim 1, wherein the porosity of the separator is 40 to 65%.

10. The non-aqueous electrolyte secondary battery according to claim 1, wherein the density of the negative electrode active material layer is 1.4 to 1.6 g/$cm^3$.

11. The non-aqueous electrolyte secondary battery according to claim 1, further comprising a pressing member for applying pressure on an outer casing such that the group pressure applied on the power generating element is 0.07 to 0.7 kgf/$cm^2$.

12. The non-aqueous electrolyte secondary battery according to claim 1, wherein the aqueous binder comprises at least one rubber-based binder which is selected from the group consisting of a styrene-butadiene rubber, an acrylonitrile-butadiene rubber, a methyl methacrylate-butadiene rubber, and a methyl methacrylate rubber.

13. The non-aqueous electrolyte secondary battery according to claim 12, wherein the aqueous binder comprises a styrene-butadiene rubber.

* * * * *